(12) United States Patent
Yamazaki et al.

(10) Patent No.: US 6,564,889 B1
(45) Date of Patent: May 20, 2003

(54) CRAWLER VEHICLE

(75) Inventors: Nobuo Yamazaki, Wako (JP); Katsuhisa Ichikawa, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/889,723

(22) PCT Filed: Mar. 7, 2001

(86) PCT No.: PCT/JP01/01766

§ 371 (c)(1),
(2), (4) Date: Jul. 20, 2001

(87) PCT Pub. No.: WO02/070329

PCT Pub. Date: Sep. 12, 2002

(30) Foreign Application Priority Data

Sep. 8, 1999 (JP) .......................................... 11-254590
Sep. 9, 1999 (JP) .......................................... 11-255713

(51) Int. Cl.[7] .............................................. B62D 55/06
(52) U.S. Cl. ...................................... 180/9.54; 305/134
(58) Field of Search ........................ 180/9.1, 9.5, 9.52, 180/9.54; 305/132, 129, 133, 134, 124; 280/677, 678, 679, 680, 681

(56) References Cited

U.S. PATENT DOCUMENTS 3,974,891 A * 8/1976 Persson ..................... 180/9.44
5,358,064 A * 10/1994 Oertley ....................... 180/9.1
6,247,547 B1 * 6/2001 Lemke et al. ................ 180/9.5
6,378,635 B1 * 4/2002 Yoshida et al. .............. 180/9.5

FOREIGN PATENT DOCUMENTS

| JP | 51 30378 | | 8/1976 |
|---|---|---|---|
| JP | 591234065 | A1 * | 8/1984 |
| JP | 63242787 | | 10/1988 |
| JP | 11192981 | | 7/1999 |
| JP | 2000233773 | | 8/2000 |

* cited by examiner

*Primary Examiner*—Kevin Hurley
(74) *Attorney, Agent, or Firm*—Adams & Wilks

(57) ABSTRACT

A crawler vehicle comprises a body frame and an auger mounted to the body frame at a front portion thereof, the body frame being mounted to a rear portion of a crawler frame via a pivot shaft to allow the crawler frame carrying a crawler belt to swing vertically. The pivot shaft is located forwardly of a lower idle wheel rotatably mounted to the crawler frame. Positioning of the pivot shaft forwardly of the lower idle wheel allows the auger to move downward even when a front portion of the crawler belt is lifted. This causes the auger to move downward regardless of new snow or hard snow, enabling the auger to carry out snow-removing operation in a highly efficient manner.

3 Claims, 7 Drawing Sheets

CRAWLER VEHICLE

REFERENCE TO RELATED APPLICATION

The application is a U.S. national stage application of copending International Application Serial No. PCT/JP01/01766 filed Mar. 7, 2001 and published in a non-English language.

TECHNICAL FIELD

This invention relates generally to a crawler vehicle and, more particularly, to an improvement in a snow-removing machine.

BACKGROUND OF THE INVENTION

A crawler vehicle having at its front portion a working member (snow-removing section) is disclosed in, for example, Japanese Patent Publication No. SHO-51-30378 entitled "Snow-Removing Machine". This snow-removing machine comprises a body frame connected to a rear portion of a crawler frame, which has a front portion equipped with a driven wheel and a lower portion equipped with two guide wheels, through a pivot shaft for vertical swinging movement, a snow-removing section mounted at a front portion of the body frame and serving as a working member, an engine mounted on the body frame, a drive wheel mounted to a rear portion of the body frame, and a crawler belt trained around the drive wheel, the driven wheel and the guide wheels.

In addition, during traveling of the crawler vehicle with its snow-removing section held in an inoperative state, a jack is extended to allow the body frame to swing clockwise about the pivot shaft, lifting the snow-removing section to thereby prevent the snow-removing section from hitting an obstacle on the road surface.

FIGS. 6A and 6B hereof are schematic side elevational views showing operations of the aforementioned conventional snow-removing machine. More specifically, FIG. 6A shows that the snow-removing machine in snow removing operation, while FIG. 6B shows a state in which a jack 101 remains in an extended condition to allow a body frame 103 to swing clockwise about a pivot shaft 102 such that a snow-removing section 104 is lifted.

When the snow-removing section 104 is lifted, a drive wheel 105 moves downward as shown by arrow ①. As a result, the distance M between the center of a driven wheel 106 and the center of the drive wheel 105 slightly varies such that the distance N between the center of the drive wheel 105 and the center of the rearmost guide wheel 107 decreases. As the distances M and N vary in such a manner, tension of a crawler belt 108 also varies. When the tension of the crawler belt 108 exceeds an excessive level, the crawler belt 108 encounters a breakdown. In contrast, when the tension of the crawler belt 108 is too small, the crawler belt 108 is apt to be dislocated from the drive wheel 105 or the driven wheel 106.

Now, discussion will be made as to an operation of the snow-removing machine when it accidentally runs on hard snow during snow-removing operation with reference to FIGS. 7A to 7C.

In FIG. 7A, the crawler belt 108 is held in close contact with road surface 100, with the body frame 103 and an auger 104 located at the front portion of the crawler vehicle being held at a given height from the road surface 100 by the action of a pivot shaft 102 mounted at a rear portion of a crawler frame 109 located inside the crawler belt 108 and the jack 101 located forwardly of the pivot shaft 102. Reference numeral 110 designates a sleigh which serves as a member for suitably maintaining the auger 104 at the given height from the road surface 100 or as a member for reducing weight and load of the auger 104 to be applied to the body frame 103. A pentagon is formed by connecting the sleigh 110, the auger drive shaft 112, the pivot shaft 102, the center of the guide wheel 107, and the sleigh 110 (hereinafter referred to as a "pentagon X").

It has been proposed to provide a snow-removing practice wherein, when an object to be removed is new snow, the auger 104 is intentionally lowered with a view to remove an increased amount of snow. In such a practice, the jack 101 is retracted to allow of the body frame 103 to rotate counterclockwise about the pivot shaft 102, thereby lowering the auger 104.

However, when the snow-removing machine accidentally comes across hard snow with the jack 101 held in the retracted state, the snow-removing machine encounters the following problems. In this event, the sleigh 110 runs on hard snow, causing the crawler belt 108 to be lifted up from the road surface 100 in the vicinity of the driven wheel 106. That is, the crawler belt 108 is caused to rotate clockwise as a whole at an angle θ1 about the pivot shaft 102. In parallel with such a movement, the pentagon X shown in FIG. 7A varies in a manner as described below.

The center 107a of the guide wheel 107 is caused to swing clockwise at the angle θ1 about the pivot shaft 102. Since, in this instance, the center 107a remains at a fixed height from the road surface 100, the pivot shaft 102 is lowered. Since, in this event, the sleight 110 and the body frame 103 form a common rigid structure to which the auger shaft 112 and the pivot shaft 102 are interconnected, the line segment connected between the sleigh 110 and the auger shaft 112 and the line segment connected between the auger shaft 112 and the pivot shaft 102 intersects at an angle α which remains unchanged at a constant value.

When the pivot shaft 102 is lowered with the angle α held constant, the auger shaft 112 is apt to swing clockwise about the sleigh 110, causing the auger shaft 112 to rise. Pentagon formed during such a movement is referred to as the pentagon Y.

FIG. 7C shows the pentagons X and Y in an overlapped state. When the center 107a is caused to swing clockwise at the angle θ1 about the pivot shaft (provided that, since the level of the center 107a remains unchanged, the pivot shaft 102 swings clockwise about the center 107a by appearance), the pivot shaft 102 is lowered by the distance Δ1 and, in link motion therewith, the auger shaft 112 swings clockwise at the angle θ2 about the sleigh 110, thereby lifting up the auger shaft 112 by the distance Δ2.

Thus, when the auger shaft 112 is raised and the pivot shaft 102 is lowered, the auger 104 shown in FIG. 7B is tilted upward more than that shown in FIG. 7A, thereby deteriorating biting effect of the snow.

As discussed above, in the conventional snow-removing machine, if the auger is lowered when the snow-removing machine removes snow deeply, the auger is apt to be tilted upward with a resultant decrease in performance efficiency of the snow-removing operation.

SUMMARY OF THE INVENTION

It is therefore an object of the present invention to provide a crawler vehicle which has an improved performance efficiency in snow-removing operation and is able to minimize the variation in tension of a crawler belt.

According to an aspect of the present invention, there is provided a crawler vehicle comprising a crawler frame having a front portion carrying a driven wheel and a lower portion carrying at least one lower idle wheel, a body frame connected vertically swingably to a rear portion of the crawler frame, a working member mounted to a front portion of the body frame, an engine mounted to the body frame, a drive wheel mounted to a rear portion of the body frame, and a crawler belt trained around the drive wheel and the driven wheel, characterized by a pivot shaft positioned forwardly of the lower idle wheel for allowing the vertical swinging movement of the body frame.

When the front portion of the crawler belt is lifted up from the road surface, the center of the lower idle wheel is apt to swing about the pivot shaft. Since, in this event, the pivot shaft is located forwardly of the lower idle wheel, the swing movement of the lower idle wheel causes the pivot shaft to be lifted. Due to this lifting movement of the pivot shaft, the auger shaft swings about the sleigh and is lowered. Consequently, it is possible for the auger to be lowered regardless of soft snow or hard snow, thereby carrying out snow-removing operation in an efficient manner.

In a preferred form, the lower idle wheel comprises a plurality of lower idle wheels while the pivot shaft is located forwardly of a lower rearmost one of the idle wheels. However, the pivot shaft should be positioned rearward of a lower idle wheel which is located next to the rearmost lower idle wheel at a front area thereof.

It is desirable that the pivot shaft for connecting the body frame to the crawler frame is positioned forwardly of the lower idle wheel, the drive wheel is positioned rearwardly of the lower rearmost idle wheel, the lower idle wheel is positioned at a lower intermediate position between the pivot shaft and the drive wheel, and an upper idle wheel is mounted to the crawler frame for supporting the crawler belt at an upper intermediate position between the pivot shaft and the drive wheel.

By connecting the body frame to the crawler frame with the pivot shaft, the body frame is enabled to arbitrarily swing, thereby allowing the front working member to be adjusted in height relative to ground surface or road surface. During such an adjustment, although the drive wheel is raised or lowered, provision of the additional upper idle wheel allows the total length of the crawler belt to be maintained at a substantially constant value for thereby minimizing the variation in tension to be exerted to the crawler belt. This results in remarkably extended life of the crawler belt.

In a specific form, the working member comprises a snow-removing section. More specifically, it comprises an auger or a blade for pushing and removing earth and sand as well as arable soil.

DETAILED DESCRIPTION OF THE INVENTION

Figure 1:
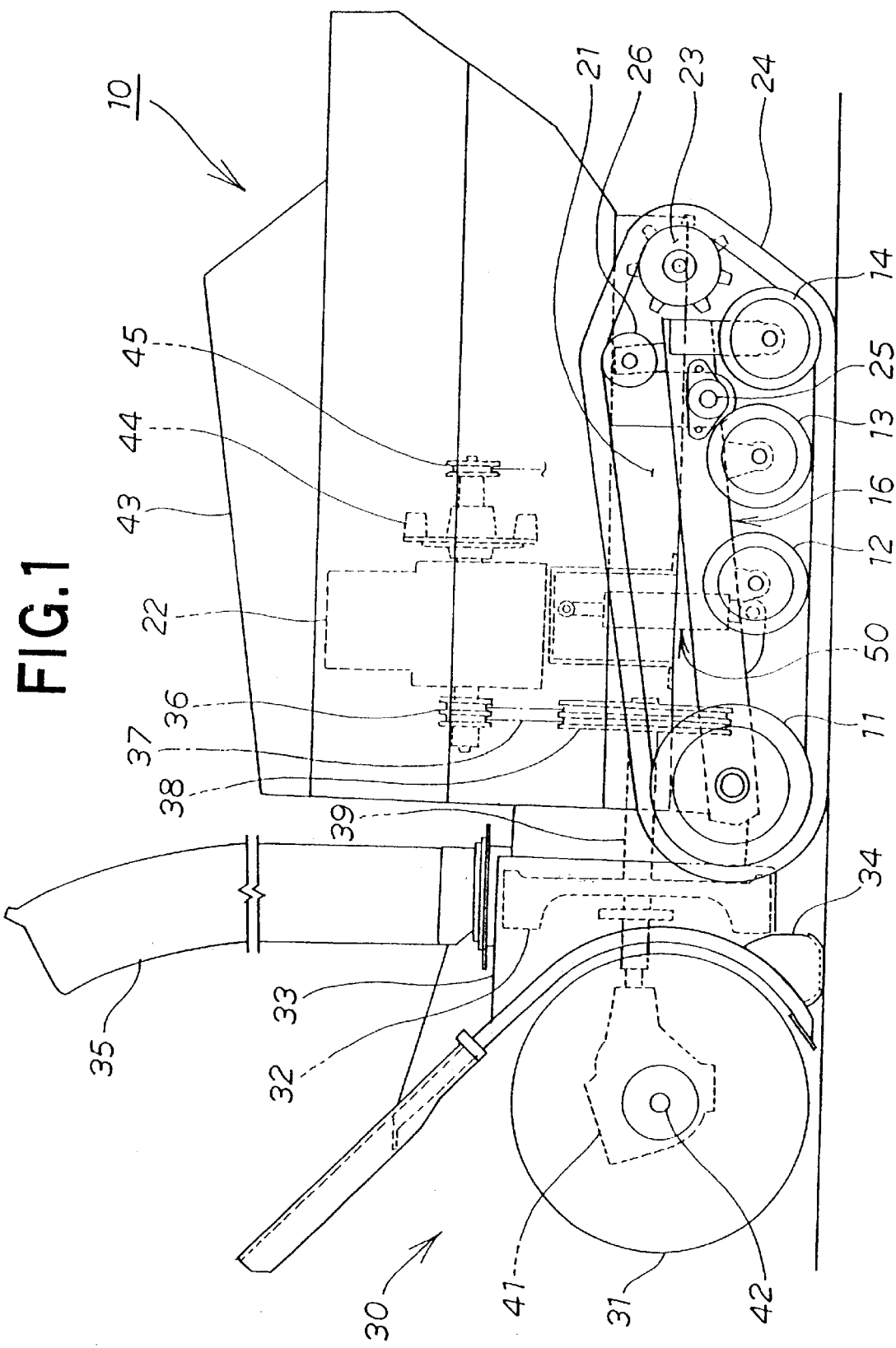
FIG. 1 is a side view of a crawler vehicle according to the present invention.

Referring now to FIG. 1, which is a side view of a preferred embodiment of a crawler vehicle according to the present invention, there is shown the crawler vehicle as applied to an example of a snow-removing machine.

The snow-removing machine 10, which serves as the crawler vehicle, includes a crawler frame 16 which has a pair of driven wheels 11 rotatably supported at a front portion of the crawler frame 16, and three pairs of lower idle wheels 12, 13 and 14 which are mounted at a lower portion of the crawler frame 16. A rear portion of the crawler frame 16 is connected to a body frame 21 to allow the same to swing in upward or downward directions. A front portion of the body frame 21 is mounted with a snow-removing section 30 which serves as a working member. An engine is mounted on the body frame 21. A drive wheel 23 is rotatably mounted at a rear portion of the body frame 21. A crawler belt 24 is tensioned between the pair of driven wheels 11 and the drive wheel 23. The crawler frame 16 and the body frame 21 are connected to one another via a pivot shaft 25. The rearmost idle wheel 14 is located in a lower position intermediate between the pivot shaft 25 and the drive wheel 23. The pivot shaft 25 is located forwardly of the pair of the rearmost idle wheels 14. The drive wheel 23 is located rearward of the pair of rearmost idle wheels 14. An upper idle wheel 26 is mounted on the crawler frame 16 in an upper position intermediate between the pivot shaft 25 and the drive wheel 23 to exert a tension to the crawler belt 24.

A snow-removing section 30 includes an auger 31 driven by a drive source composed of the engine 22, a blower 32, a snow-remover housing 33, a sleigh 34 and a snow discharge shooter 35. The engine produces a power output which is sequentially delivered through a small pulley 36, a belt 37, a large pulley 38, a drive shaft 39 and an auger shaft 42 to rotate the auger 31. Rotation of the auger 31 allows snow over the road surface to be gathered and transferred to the blower 32 through which snow is discharged via the shooter 35 due to a centrifugal force of the blower 32. Reference numeral 41 designates a gear case and a reference numeral 43 designates an engine cover. Reference numeral 44 designates an engine cooling fan. Reference numeral 45 designates an output pulley which drives and rotates the drive wheels 23 via the belt.

Figure 2:
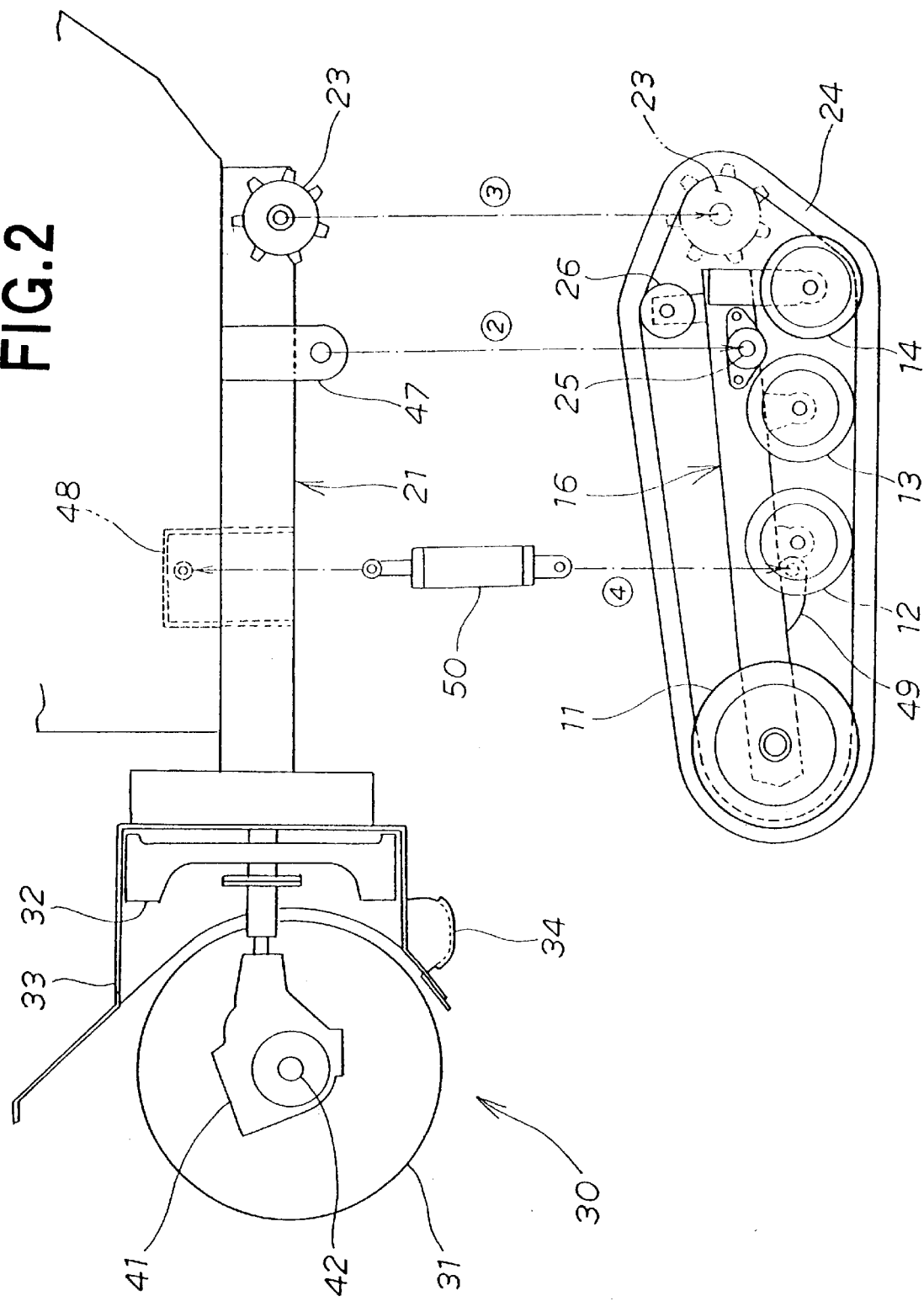
FIG. 2 is an exploded side view of relevant parts of the crawler vehicle shown in FIG. 1.

FIG. 2 is an exploded view of an essential part of the snow-removing machine according to the present invention. In FIG. 2, the body frame 21 is connected to the crawler frame 16 via a bracket 47 and the pivot shaft 25 to allow the body frame 21 to swing upward or downward. Upward and downward movement is implemented with a hydraulic cylinder 50 for auger height adjustment which is mounted between an upper bracket 48 of the body frame 21 and a lower bracket 49 of the crawler frame 16.

That is, the body frame 21 is interconnected to the crawler frame 16 in a manner as shown by an arrow ② and the crawler belt 24 is engaged with the drive wheels 23 in a manner as shown by an arrow ③. The hydraulic cylinder 50 is mounted to the crawler frame 16 in a manner as shown by an arrow ④ and subsequently the hydraulic cylinder 50 is caused to expand and contract, thereby allowing the body frame 21 to swing about the pivot shaft 25. As a result, the drive wheel 23 shown by a phantom line in FIG. 2 is moved upward or downward about the pivot shaft 25.

Now, the upward and downward movement of the drive wheel 23 is described below in detail with reference to FIGS. 3A and 3B.

Figure 3A:
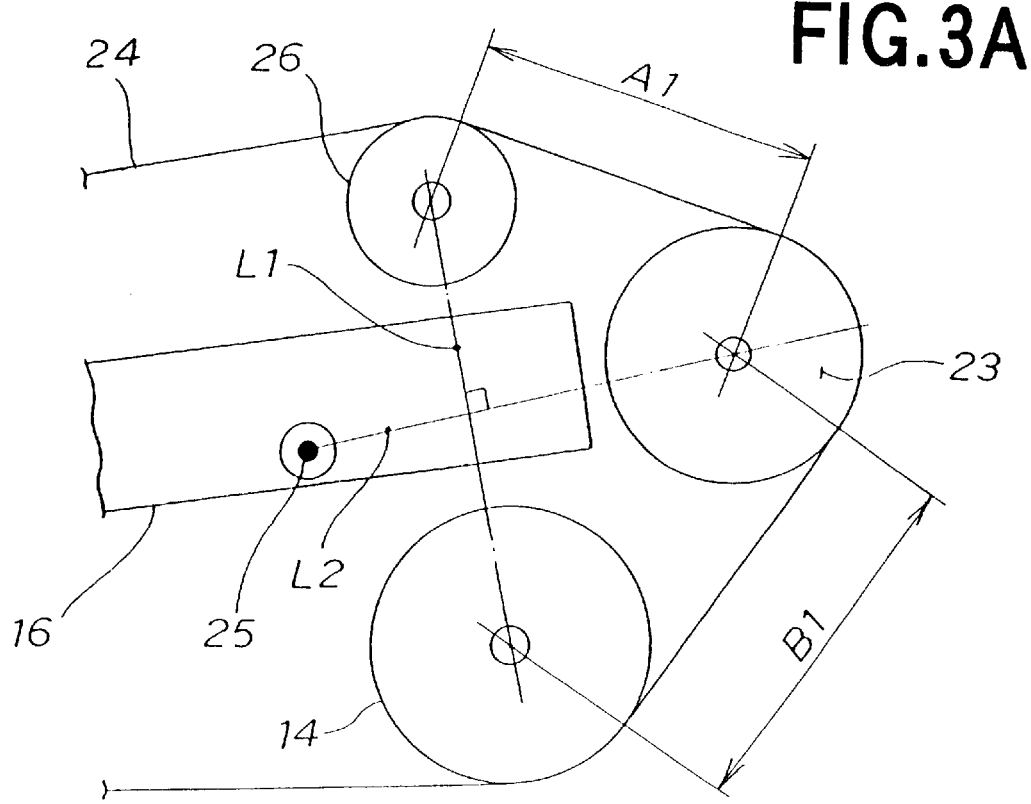
FIGS. 3A and 3B are schematic views illustrating a relationship among an upper idle wheel, a drive wheel and a lower idle wheel.

In FIG. 3A, assuming that a line segment connected between the center of the lower rearmost idle wheel 14 and the center of the upper idle wheel 26 is designated by L1 while a line segment connected between the center of the pivot shaft 25 and the center of the drive wheel 23 is designated by L2, the line segments L1 and L2 are shown as intersecting with one another at right angles. In this instance, the distance between the center of the upper idle wheel 26 and the center of the drive wheel 23 is assigned with A1, and the distance between the center of the rearmost lower idle wheel 14 and the center of the drive wheel 23 is assigned with B1.

Figure 3B:
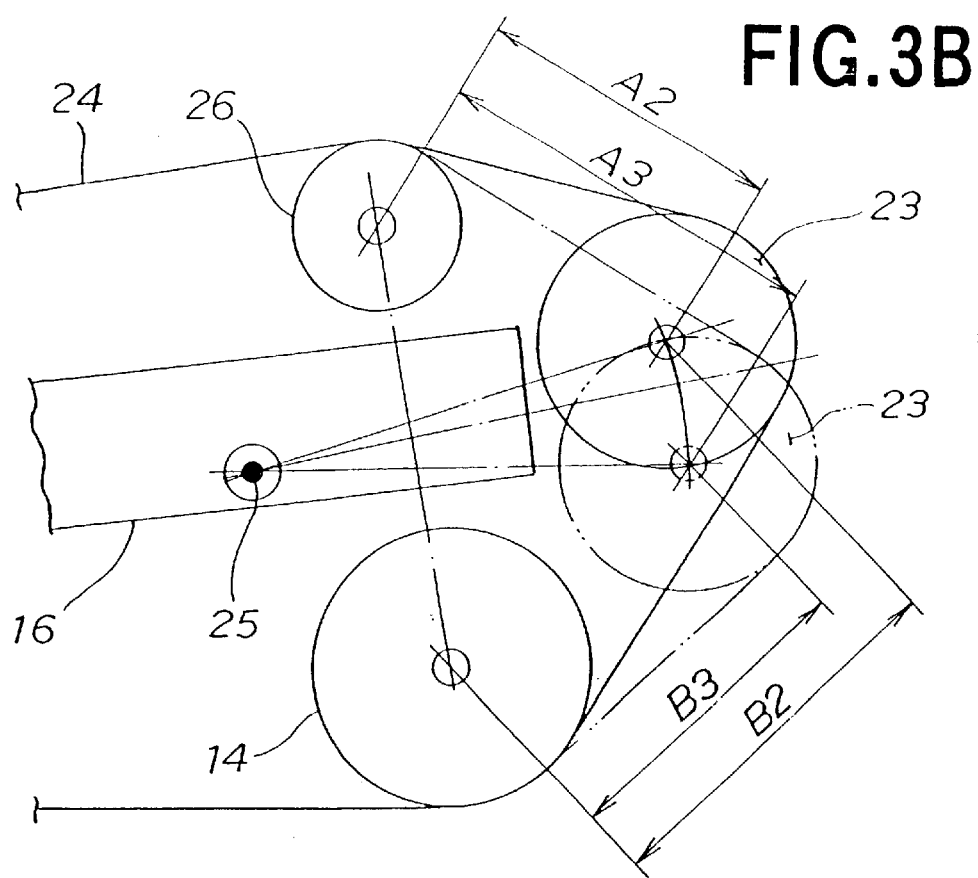

In FIG. 3B, the drive wheel 23, which is not linked to the crawler frame 16, moves upward and downward around the rotational center of the pivot shaft 25 previously described above. In this event, the distance between the upper idle wheel 26 and the drive wheel 23 varies in length between A2 and A3, and the distance between the drive wheel 23 and the lower idle wheel 14 varies between B2 and B3.

Figure 4A:
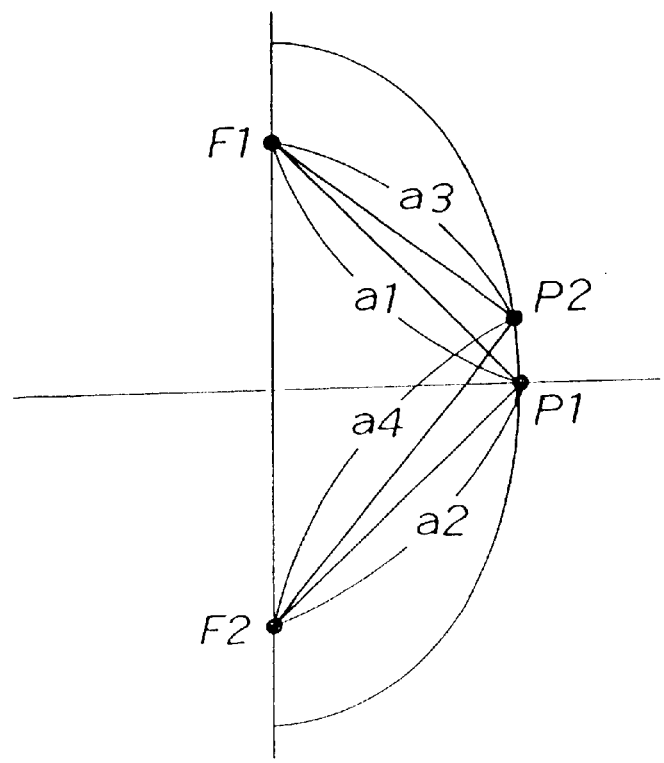
FIGS. 4A and 4B are views illustrating variations in the total length of the crawler belt.

FIG. 4A, assuming that the distance between the point P1 on an ellipse and one focus F1 is a1 and the distance between the point P1 and the other focus F2 is a2, the sum (a1+a2) is constant. That is, assuming that the distance between the other point P2 on the ellipse and the one focus F1 is a3 and the distance between the point P2 and the other focus F2 is a4, the sum (a3+a4) equals the sum (a1+a2). Thus, the ellipse has a characteristic in that the sum of distances between arbitrary point on the ellipse and respective focuses F1 and F2 becomes constant at all times.

Figure 4B:
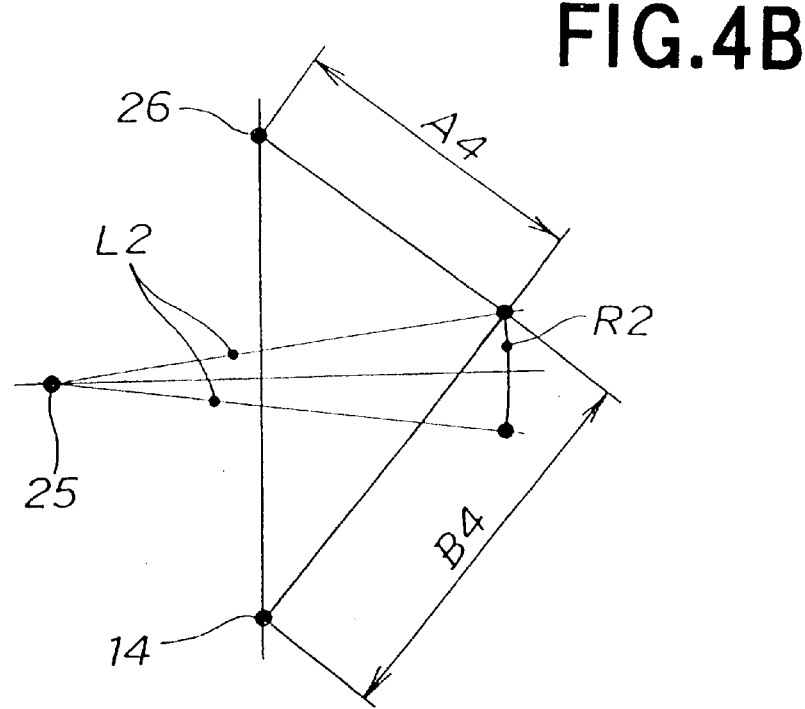

In FIG. 4B, when a circle R2 with a radius of a line segment L2 is drawn about the pivot shaft 25, it is regarded that the circle R2 closely resembles part of the ellipse shown in FIG. 4A. That is, it is regarded that the circle R2 extremely resembles the ellipse which is described with one focus provided by the center of the upper idle wheel 26 and with the other focus provided by the center of the other lower idle wheel 14. As a result, the sum (A4+B4) of the distances A4 and B4 becomes constant regardless of the swing angle of the line segment L2.

It is thus deemed that, in FIG. 3B, the relationship (A2+B2)=(A3+B3) is obtained. Accordingly, it is seen that the total length and the tensioned state of the crawler belt 24 is not varied regardless of the upward or downward movement of the drive wheel 23.

Thus, non-variation in the total length of the crawler belt 24 is reflected by the fact that the lower idle wheel 14 and the upper idle wheel 26 are located at a symmetrical position with respect to the center of the line segment L2 shown in FIG. 3A.

However, the upper idle wheel 26 is not required to be necessarily located at the symmetrical position relative to the lower idle wheel 14. There exist no inconvenience for the upper idle wheel 26 to move left and right on the plane of the drawing as long as the line segment L1 intersects the line segment L2. For this reason, even when the line segment L2 is out of intersection relative to the line segment L1, the above operation may be carried out.

In the preferred embodiment, accordingly, the pivot shaft 25 is located forwardly of the lower idle wheels 14 while the drive wheels 23 are located rearwardly of the lower idle wheels 14 such that the rearmost lower idle wheels 14 are located at the lower intermediate position between the pivot shaft 25 and the drive wheel 23. In addition, the upper idle wheel 26, which supports the respective crawler belts, is mounted onto the crawler frame 16 at the upper and intermediate position between the pivot shaft 25 and the drive wheel 23, with a resultant success in limiting variation in tension of the crawler belt 24. In this manner, as the variation in tension of the crawler belt 24 remains in a minimum range, the crawler belt 24 does not encounter breakage troubles, thereby remarkably extending the life of the crawler belt 24.

In the conventional crawler vehicles, although it has been a usual practice to have the crawler vehicle equipped with a tension adjustment mechanism composed of basic mechanical elements such as a spring, a bolt and a nut etc., application of such a complicated tension adjustment mechanism in the snow-removing machine causes the work load of the operator to remarkably increase owing to indispensable removing work for ice and snow adhered to the spring etc.

In contrast, if the variation in tension of the crawler belt 24 is kept within a minimum range as attained by the concept of the present invention, the complicated tension adjustment mechanism is not required and, even when a slight amount of tension adjustment is required, such a slight adjustment can be sufficed with a simplified tension adjustment mechanism. Consequently, the concept of the present invention is useful for a crawler vehicle of a general type equipped at its front side with a working member (such as, for example, a snow-removing section) and is useful especially for a snow-removing machine whose adhesion of snow and ice is to be considered.

Also, it is to be noted that the working member of the present invention may involve a blade for pushing out earth and sand as well as arable soil or a blade for pushing and removing snow, thus making it possible for the present invention not to be limited to the snow-removing machine but to be applied to bulldozers for civil engineering or agricultural machineries.

In the preferred embodiment, although the crawler vehicle has been shown and described as including three lower idle wheels, the crawler may have at least one lower idle wheel and at least one upper idle wheel wherein the number of idle wheels is arbitrarily determined.

Now, operation of the snow-removing machine for improving a snow-removing efficiency to cause the auger to achieve an improved biting effect is described in detail below with reference to FIGS. 5A to 5C.

Figure 5A:
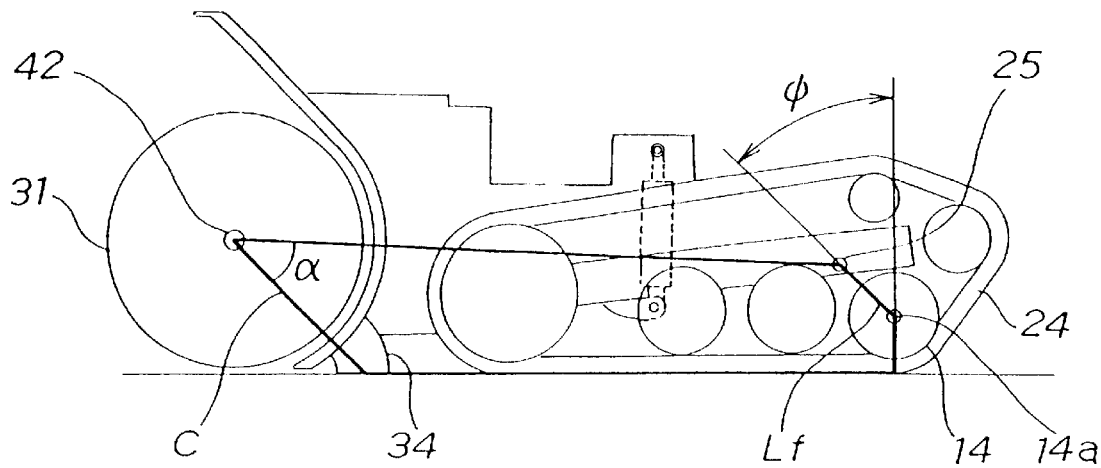
FIGS. 5A to 5C are schematic views illustrating a mode of operation of the crawler vehicle according to the present invention, wherein the crawler vehicle runs on hard snow.

FIG. 5A shows a normal operating state of the snow-removing machine. In this event, the sleigh 34, the auger 42, the pivot shaft 25 and the center 14a of the lower idle wheel 14 form a pentagon X. Here, the line segment connected between the pivot shaft 25 and the center 14a of the lower idle wheel 14 is assigned with Lf.

Figure 5B:
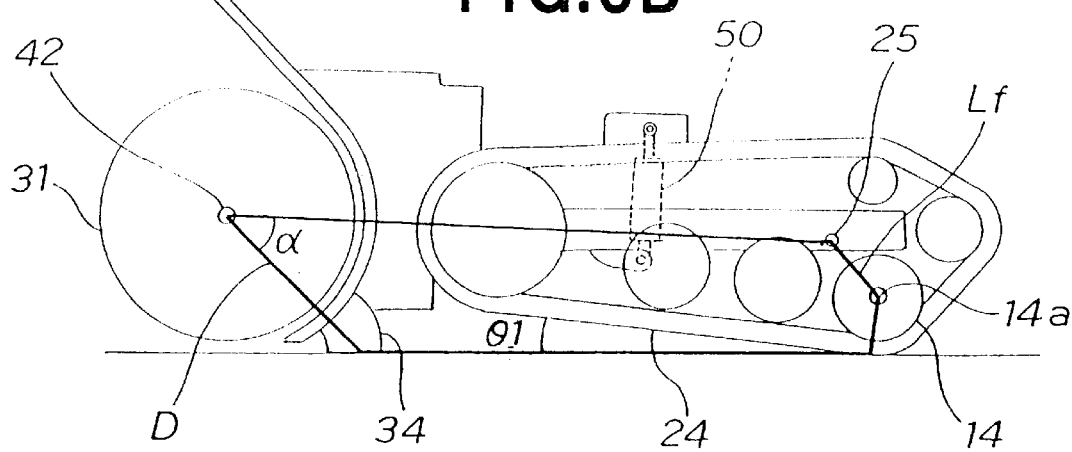
Figure 7A:
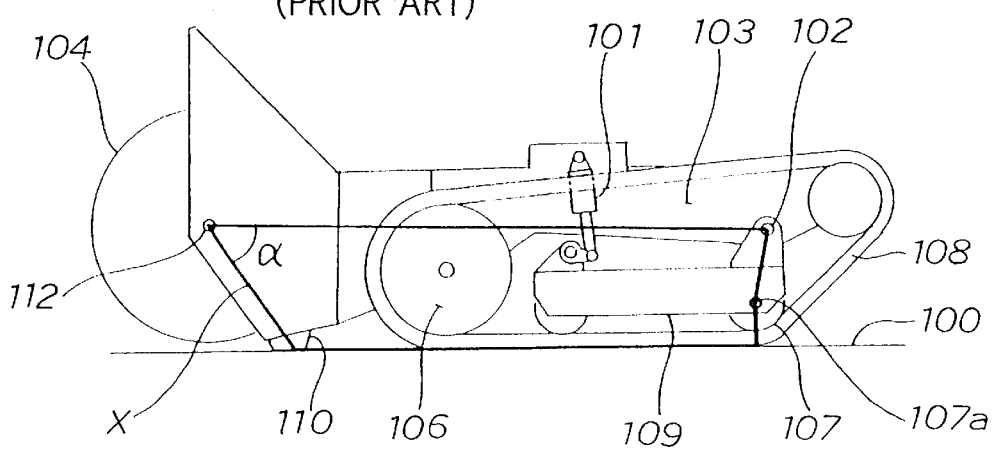
FIGS. 7A to 7C are schematic views illustrating a mode of operation of the conventional crawler vehicle as it runs on hard snow.
Figure 7B:
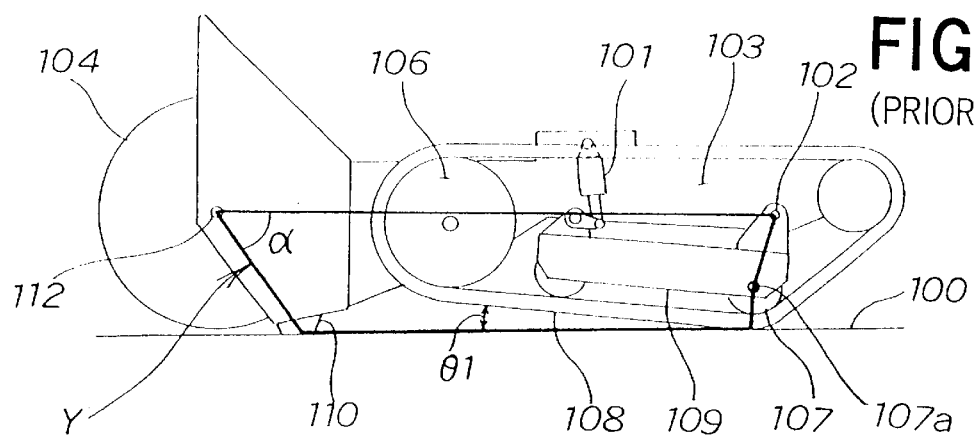
Figure 7C:

FIG. 5B shows an operating state wherein, when the hydraulic cylinder 50 is retracted and the sleigh 34 runs into hard snow, a front portion of the crawler belt 24 is lifted from the road surface. As the crawler belt 24 rotates clockwise at an angle of θ1, the line segment Lf is caused in link motion with the crawler belt 24 to swing clockwise at an angle of θ1 about the pivot shaft 25. Since, in this instance, the center 14a of the lower idle wheel 14 remains at a constant height from the ground surface, the pivot shaft 25 is consequently lifted. Since the angle α around the auger shaft 42 remains unchangeable in the same manner as discussed above with reference to FIG. 7B, the lift of the pivot shaft 25 necessarily causes the auger shaft 42 to swing counter-clockwise and to move downward around the sleigh 34. The pentagon shown in FIG. 5B is assigned with the pentagon Y.

Figure 5C:
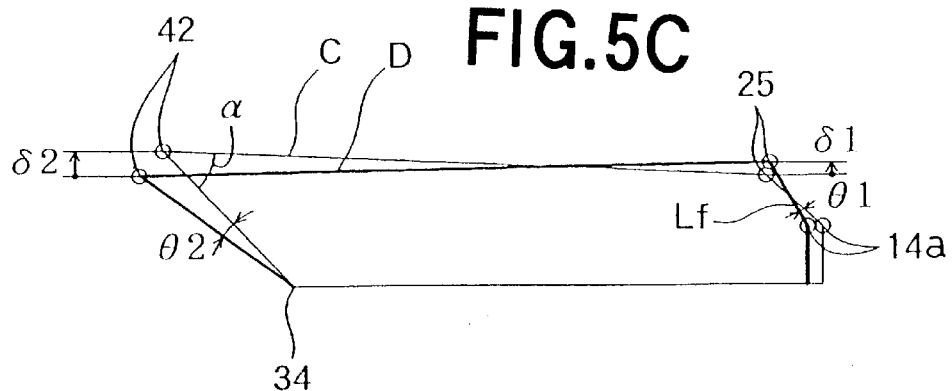
Figure 6A:
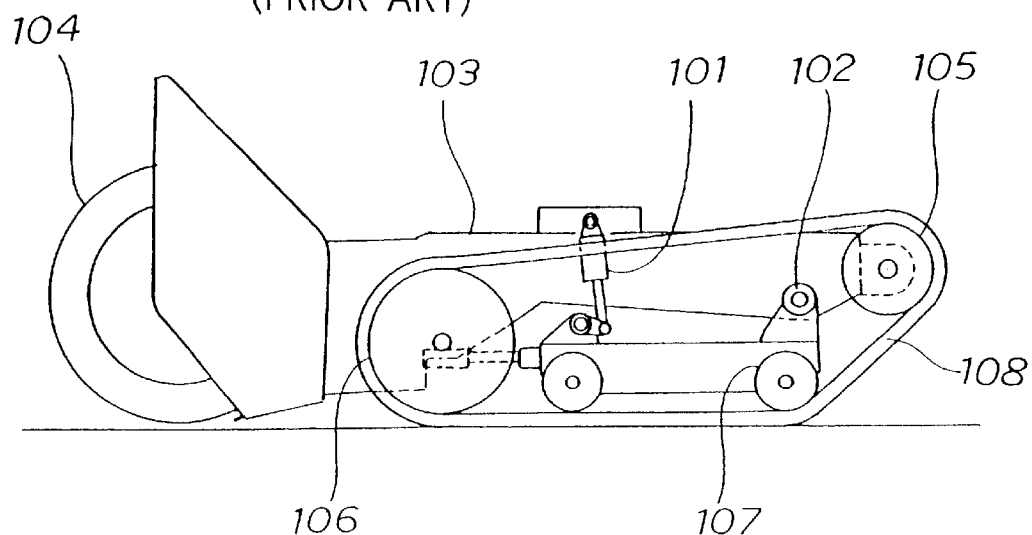
FIGS. 6A and 6B are schematic views showing a conventional crawler vehicle illustrative of a mode of operation of the conventional crawler vehicle, wherein an auger is lifted up.
Figure 6B:
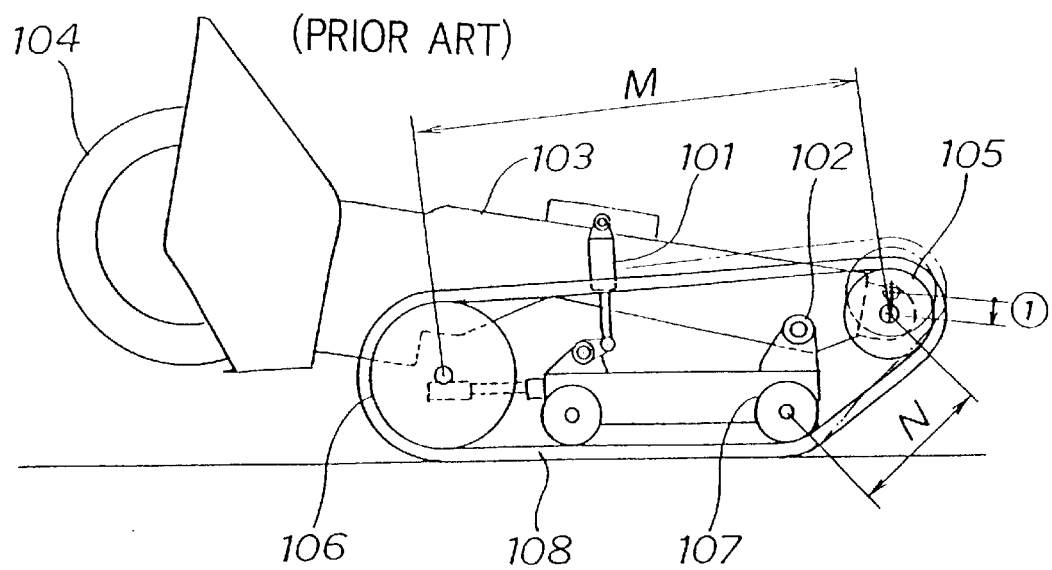

In the pentagon Y shown in FIG. 5C, the line segment Lf swings clockwise at the angle of θ1, with a resultant lifting of the pivot shaft by a value σ1. At the same time, the auger shaft 42 swings counter-clockwise at an angle θ2 about the sleigh 34, resulting inn a downward movement of the auger shaft 42 by a value σ2.

Thus, the downward movement of the auger shaft 42 allows the auger 31 to increase its biting property to a higher level than that obtained in the normal operating state shown in FIG. 5A, improving the snow-removing work efficiency.

In FIG. 5A, also, assuming that an angle defined between a vertical line and the line segment Lf is ψ, the operating state shown in FIG. 5C is established provided that the angle ψ exceeds a value 0 (zero).

Accordingly, the condition wherein the pivot shaft is located forwardly of the lower idle wheel should meet a condition which satisfies 0≦ψ. However, location of the pivot shaft 25 in an extremely forward position conflicts a requirement in that the orientation (i.e., the auger angle) of the auger 31 is to be gently varied. Accordingly, it is arranged such that the pivot shaft 25 is not located forward beyond the second idle wheel 13 closest to the rearmost idle wheel 14.

In the preferred embodiment, while the snow-removing section has been shown as composed of the auger, the snow-removing section may comprise a blade for pushing and removing snow.

INDUSTRIAL APPLICABILITY

As previously noted above, the present invention allows a pivot shaft, which rotatably interconnects a body frame to a rear portion of a crawler frame, to be located forwardly of a lower rearmost idle wheel among lower idle wheels. Lift of a front portion of a crawler belt from a road surface causes the center of the lower idle wheel to swing about the pivot shaft. During such a swing movement, since the pivot shaft remains forwardly of the lower idle wheel, the pivot shaft is lifted due to the above swing movement. As the pivot shaft is lifted up, an auger shaft is moved downward about a sleigh. Accordingly, the auger can be moved downward regardless of soft or hard snow, with a resultant highly improved snow-removing efficiency to provide a highly reliable snow-removing machine. In addition, the crawler vehicle of the present invention may also be suitably applied to bulldozers for civil engineering or agricultural machineries.

What is claimed is:

1. A crawler vehicle comprising: a crawler frame carrying at a front portion thereof a driven wheel and carrying at least one lower idle wheel and an upper idle wheel; a body frame mounted vertically swingably on a pivot shaft at a rear portion of the crawler frame; a working member mounted to a front portion of the body frame; an engine mounted to the body frame; a drive wheel mounted to a rear portion of the body frame; and a crawler belt trained around the drive wheel and the driven wheel; wherein the pivot shaft is positioned forwardly of the lower idle wheel, the drive wheel is positioned rearwardly of the lower idle wheel, the lower idle wheel is positioned at a lower intermediate position between the pivot shaft and the drive wheel, and the upper idle wheel is positioned to support the crawler belt at an upper intermediate position between the pivot shaft and the drive wheel.

2. A crawler vehicle according to claim 1; wherein the at least one lower idle wheel comprises a plurality of lower idle wheels arranged horizontally in a front-to-rear direction of the crawler vehicle, and the pivot shaft is located forwardly of a lower rearmost one of the lower idle wheels.

3. A crawler vehicle according to claims 1 or 2; wherein the working member comprises a snow-removing section.

\* \* \* \* \*